Sept. 8, 1959     J. J. VERBRUGGE     2,902,829
HYDRAULIC POWER BRAKE UNIT
Filed Dec. 20, 1956
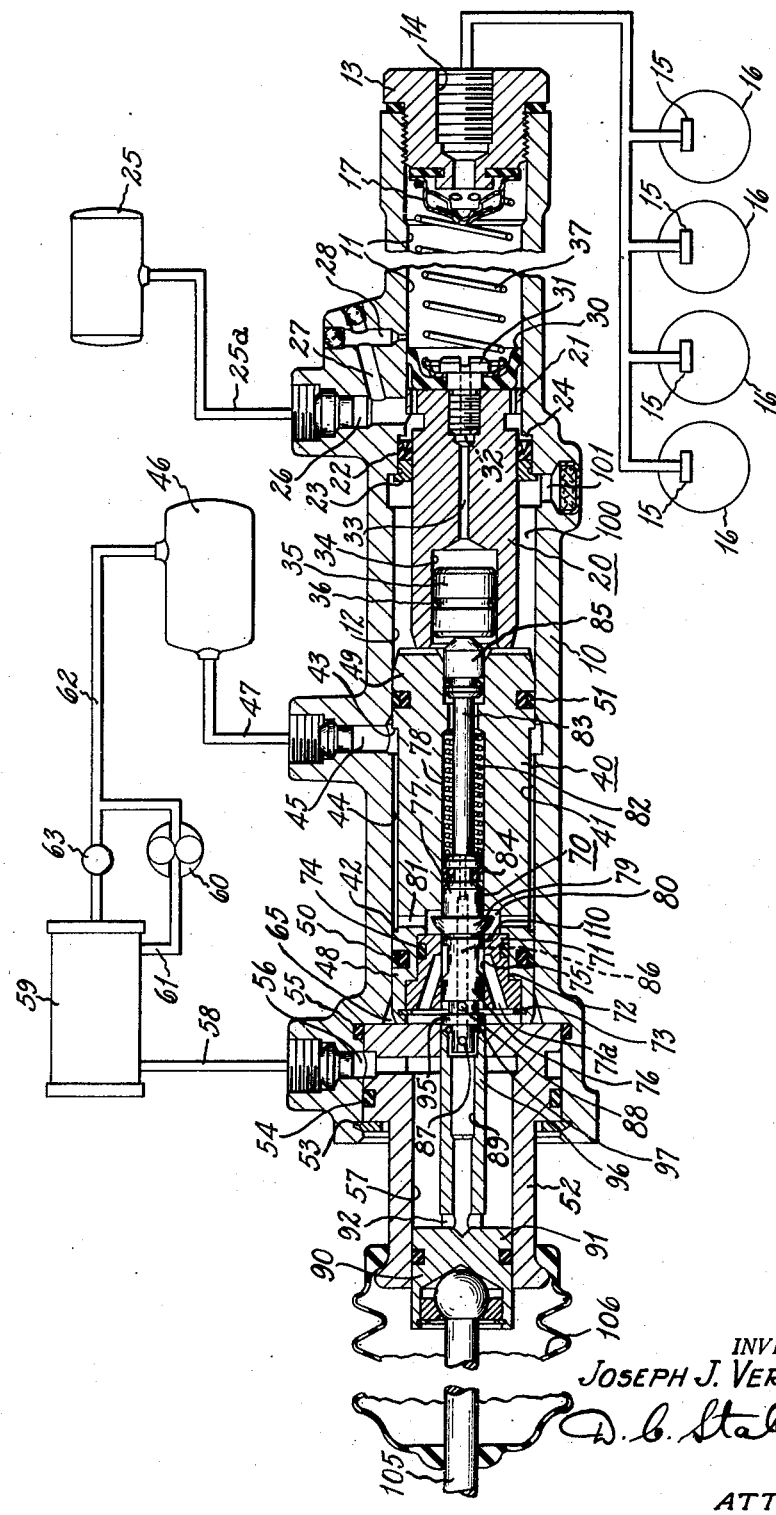
INVENTOR.
JOSEPH J. VERBRUGGE
ATTORNEY United States Patent Office 2,902,829
Patented Sept. 8, 1959

2,902,829

HYDRAULIC POWER BRAKE UNIT

Joseph J. Verbrugge, Saginaw, Mich., assignor to General Motors Corporation, Detroit, Mich., a corporation of Delaware Application December 20, 1956, Serial No. 629,589

5 Claims. (Cl. 60—54.6)

This invention relates to the hydraulic power actuator for use in a hydraulic brake system, and particularly to a hydraulic servo mechanism for actuating the piston of a master cylinder to effect brake energization.

An object of the invention is to provide a hydraulic power actuator for a hydraulic brake system that has the power unit provided with areas exposed to the actuating hydraulic pressure, with the exposed areas establishing a differential area acted on by the pressure fluid normally to position the power piston of the power unit in a retracted position.

Still another object of the invention is to provide an improved structural arrangement of a hydraulic power actuator that is capable of manufacture with greater facility and less cost.

Further objects and advantages of the present invention will be apparent from the following description, reference being had to the accompanying drawings wherein a preferred form of the invention is clearly shown.

In this invention the hydraulic power actuator for the hydraulic brake system of a motor vehicle comprises a single acting servo motor and a master cylinder that are positioned coaxially in a common cylinder housing with the several elements of the master cylinder and of the power unit being manufactured separately but arranged in coaxial manner to effect their cooperation.

As particularly disclosed in the drawing, the hydraulic power actuator consists of a housing or body 10 having an internal longitudinally extending bore from end to end of the housing 10. The bore at one end of the housing 10 forms a master cylinder bore 11 and at the opposite end of the housing forms a power cylinder bore 12. The master cylinder bore 11 is closed at one end by a threaded closure member 13 having an internal bore 14 that connects with the wheel cylinders 15 of conventional hydraulic brakes 16 on the vehicle for supply of energizing fluid to the brakes. A residual pressure check valve 17 is seated on the closure member 13 and is adapted to retain residual pressure in the hydraulic cylinder 11 during retraction movement of the master cylinder piston. The check valve 17 allows fluid under pressure to flow into the port 14 for supply to the brakes when the master cylinder piston is advanced in the master cylinder bore 11.

A master cylinder piston 20 is slidable in the bore 11 and has the enlarged head portion 21 that is in slidable contact with the cylinder bore 11. A seal member 22 forms the rear wall of the master cylinder 11 and prevents loss of hydraulic fluid from the master cylinder into the cylinder bore 12. A retaining member 23 holds the seal 22 in place in the recess 24 at the rear end of the cylinder bore 11.

The cylinder bore 11 is connected with a fluid reservoir 25 by means of the conduit 25a, a port 26 providing for supply of brake fluid to the master cylinder bore 11 through the port 26 or through the ports 27 and 28.

The master cylinder piston 20 is in the position illustrated in the drawing when the brakes are in released condition whereby the cylinder bore 11 communicates with the reservoir 25 through the ports 28, 27 and 26.

The forward end of the master cylinder piston 20 carries a cup seal 30 that is held in place on the master cylinder piston by the screw 31. The screw 31 has a bore 32 that communicates with the passage 33 and thereby with the piston bore 34 in the master cylinder piston 20 that receives a reaction piston 35 for movement in the bore 34. An O ring seal 36 is provided on the reaction piston 35 to prevent a loss of hydraulic fluid from the chamber bore 11. A compression spring 37 normally urges the master cylinder piston in a left hand direction when the brakes are released for positioning it in the position shown in the drawing.

The power cylinder bore 12 receives a power piston 40 that has an annular recess 41 forming shoulders 42 and 43 at opposite ends of the recess 41. The recess 41 cooperates with the cylinder bore 12 to form a fluid pressure chamber 44 that is in continuous communication with a fluid pressure inlet port 45 that in turn is connected with a pressure accumulator 46 by the conduit 47.

The larger diameter end portions 48 and 49 of the power piston 40 have seal members 50 and 51 that engage the wall of the cylinder bore 12 whereby to prevent loss of fluid from the pressure fluid chamber 44.

The diameter of the end portion 48 is slightly larger than the diameter of the end portion 49 of the power piston 40 so that the area of the shoulder 42 is larger than the area of the shoulder 43. The differential in area between the shoulders 42 and 43 is sufficient to provide for a positive movement of the power piston 40 in a left hand direction by the fluid pressure standing in the chamber 44. For example, the diameter of the end portion 48 of the power piston may be 1.25" whereas the diameter of the end portion 49 of the piston may be 1.24", thereby providing for the differential of area between the shoulders 42 and 43.

The power cylinder 12 has a closure member 52 retained in one end thereof by means of the snap ring 53, O ring seal members 54 and 55 sealing the periphery of the closure member 52. An exhaust port 56 is provided in the closure member 52 that communicates with a plunger bore 57 in the closure member and connects with conduit 58 that communicates with the fluid supply reservoir 59 for return of fluid to the reservoir. Hydraulic fluid is removed from the reservoir by the pump 60 through the line 61 and discharged through the line 62 into the accumulator 46 whereby to maintain a predetermined level of pressure in the accumulator 46. A pressure relief valve 63 connects the line 62 with the reservoir 59 to provide for delivery of excess fluid to the reservoir when the pressure reaches a predetermined value in the accumulator 46.

The closure member 52 cooperating with the cylinder 12 forms a work chamber 65 at the left hand end of the power piston 40. Delivery of fluid under pressure into the work chamber 65 advances the power piston 40 in the cylinder 12 and thereby advances the master cylinder piston 20 into the master cylinder bore 11.

Supply of working fluid under pressure to the work chamber 65 and exhaust of work fluid from the chamber 65 to the exhaust port 56 is controlled by a valve member 70 that cooperates with a valve seat member 71.

The valve seat member 71 is retained in the recess 72 in the power piston 40 by means of a snap ring 73, and carries an O ring seal 74 to seal against high pressure fluid moving around the periphery of the member 71. The member 71 has a plurality of passages 71a that communicate with the bore 75 in the seat member 71.

The valve member 70 has a stem portion 76 that is slidable in the bore 75 and an extension 77 slidable in a bore 78 in the piston 40. The mushroom valve head 79 is disposed in a recess chamber 80 in the piston 40 that communicates with the annular chamber 44 by means of ports 81.

The valve head 79 is retained on its seat on the seat member 71 by means of a compression spring 82 retained in the bore 78 that urges the plunger 83 against the stem extension 77 of the valve member 70, a seal 84 being provided around the plunger 83. The forward end 85 of the plunger 83 engages the reaction piston 35.

The valve stem 76 of the valve 70 has a longitudinal bore 86 that connects with transverse bores 87 and 88. The transverse bore 87 as well as the longitudinal bore 86 connects with a longitudinal bore 89 in the actuating element 90 that has the piston head 91 thereof slidable in the bore 57 of the closure wall 52. The longitudinal bore 89 connects with the piston bore 57 by means of the transverse bores 92.

The valve stem 76 of the valve 70 has a land 95 that cooperates with the left hand edge of the bore 75 in a manner that when the valve head 79 is seated as illustrated in the drawing, a passageway is provided between the land 95 and the left hand edge of the bore 75 whereby the work chamber 65 is connected with the exhaust port 56 through the aforementioned passage and thence through the passages 88, 86, 89, 92 and the bore 57.

The actuator 90 has the forward end 96 engaging the head forming the land 95, an O ring seal 97 being provided between the valve stem and the forward end of the actuator 90.

An annular chamber 100 is formed around the left hand end of the master cylinder piston 20, this chamber being in continuous communication with the atmosphere through a port 101 containing a filter 102. Thus any leakage of fluid either from the chamber 44 or from the master cylinder chamber 11 can be exhausted through the atmosphere port 101.

The actuator 90 is connected with the brake pedal of a vehicle by means of a link 105 that is adapted to move the actuator in a right hand direction when the brake is applied. A rubber boot 106 seals the actuator 90 against excess of dirt thereto.

The hydraulic power actuator is illustrated in the drawing in the position attained with the brakes in released or non-applied position. It will be understood that the pump 60 maintains a predetermined pressure in the accumulator 46 that therefore stands in the annular chamber 44.

When the brake pedal of the vehicle is actuated, the actuator 91 will be moved in a right hand direction. The first movement of the actuator 90 causes the land 95 to engage the left hand end of the bore 75 and thereby close off communication between the work chamber 65 and the exhaust port 56 through the passages heretofore mentioned. Slight additional movement of the actuator 90 in a right hand direction will cause the land 110 to be removed from the right hand end of the bore 75 whereby fluid under pressure can flow from the annular chamber 44 through the port 81 and the recess 79 into the bore 75 and thence through the passages 71a into the work chamber 65. This causes the piston 40 to move in a right hand direction and advances the master cylinder piston 20 into the master cylinder bore 11. When the forward end of the cup seal 30 passes the port 28, pressure will be developed in the master cylinder bore 11 for delivery through the residual pressure check valve 17 into the wheel cylinders 15 of the brakes for energizing the brakes.

When pressure builds up in the master cylinder bore 11, this pressure is transmitted through the passages 32 and 33 into the piston chamber 34 to react on the reaction piston 35 and urge it in a retracted position against the plunger 83 which in turn transfers the force to the valve member 70 and it in turn to the actuator 90 so that the operator will sense the brake pressure being applied.

The application of brake pressure can be stopped at any time the actuator 90 is stopped by the operator holding his foot in a steady position. When this occurs the power piston 40 will move forward only sufficient to cause the left hand edge of the land 110 to close the forward edge of the bore 75. This leaves the right hand edge of the land 95 within the left hand end of the bore 75 so that the hydraulic fluid pressure in the chamber 65 is locked and the power piston is retained in a "hold" position. Further advancement of the brake can be occasioned at any time by the operator moving the pedal in a downward direction which again advances the valve member 70 in a right hand direction.

When the brake is to be released, the removal of the foot of the operator from the brake pedal permits the spring 37 as well as pressure in the brake system to cause the master cylinder piston 20 to move in a left hand direction, thus moving the power piston 40 in the same direction. At this time the spring 82 will cause the valve head 79 to seat upon the seat member 71 and open the passage between the land 95 and the left hand edge of the bore 75 so as to connect the work chamber 65 with the exhaust passage 56.

To insure return of the work piston 40 to its full retracted position, the differential area of the shoulders 42 and 43 provides for positive movement of the power piston 40 in a left hand direction completely independent of any action caused by the spring 37 or the pressure fluid in the hydraulic brake system.

While the form of embodiment of the invention as herein disclosed constitutes a preferred form, it is to be understood that other forms might be adopted as may come within the scope of the claims which follow.

What is claimed is as follows.

1. A power actuator for operating hydraulic brakes, comprising in combination, a body having a longitudinally extending bore one end portion of which forms a master cylinder and the other end portion forming a power cylinder, a master cylinder piston advanceable in said master cylinder to compress fluid therein to effect brake energization, a seal forming the inner end wall of the master cylinder, said master cylinder piston extending through said seal member into the power cylinder, a power piston in said power cylinder engaging said master cylinder piston and advanceable in the power cylinder to advance the master cylinder piston, seal means at each end of the power piston between the said piston and its cylinder, a fluid pressure inlet port in said body between said power piston seal means, said bore of the body between the master seal member and the power piston seal means adjacent the end of the power piston that engages the master cylinder piston having a port continuously open to atmosphere for bleeding of this portion of the bore, fluid passage means in said power piston connecting said fluid pressure inlet port in said body to the work end of said power piston, a valve member carried in said power piston controlling admittance of fluid pressure to the work end of the power piston and exhaust of fluid pressure from the said work end, a closure wall for the work end of said power cylinder, and an operating member projecting through the closure wall into engagement with said valve member to actuate the same, said master cylinder piston having a bore therein receiving a piston freely movable in the bore and having passage means connecting the bore with the master cylinder for transfer of pressure fluid from the master cylinder into the bore, and a plunger member slidable in said power piston and engaging said valve member and said piston in said master cylinder piston to transfer "feel" of brake operating pressure from the master cylinder to said valve operating member.

2. An hydraulic power actuator for operating hydraulic brakes, comprising in combination, a body having a longitudinally extending bore one end portion of which forms a master cylinder and the other portion forming a power cylinder, a master cylinder piston advanceable in said master cylinder to compress fluid therein to effect brake energization, a seal member forming the inner end wall of the master cylinder, said master cylinder piston extending through said seal member into the power cylinder, said master cylinder piston having a bore therein receiving a piston freely movable in the bore and having passage means connecting the bore with the master cylinder for transfer of pressure fluid from the master cylinder into the bore, a power piston in said power cylinder engaging said master cylinder piston and advanceable in the power cylinder to advance the master cylinder piston, seal means at each end of the power piston between the said piston and its cylinder, said power piston having a reduced diameter portion between the seal means thereon forming with said power cylinder an annular fluid chamber closed at its ends by shoulders of the large diameter portion of the power piston, said shoulders having different areas exposed to the fluid pressure in said annular chamber, the differential in area of the shoulders providing for movement of the power piston in one direction of movement, a fluid pressure inlet port in said body between said power piston seal means continuously communicating with said annular fluid pressure chamber, fluid passage means in said power piston connecting said fluid pressure inlet port in said body to the work end of said power piston, a valve member carried in said power piston controlling admittance of fluid pressure to the work end of the power piston and exhaust of fluid pressure from the said work end, a closure wall for the work end of said power cylinder, and a valve operating member projecting through the closure wall into engagement with said valve member to actuate the same, said power piston having a hollow portion for receiving a plunger member slidable in said power piston and engaging said valve member and said piston in said master cylinder piston to transfer "feel" of brake operating pressure from the master cylinder to said valve operating member.

3. An hydraulic power actuator for operating hydraulic brakes, comprising in combination, a body having a longitudinally extending bore one end of which forms a master cylinder and the other portion forming a power cylinder, a master cylinder piston advanceable in said master cylinder to compress fluid therein to effect brake energization, a seal member forming the inner end wall of the master cylinder, said master cylinder piston extending through said seal member into the power cylinder, a power piston in said power cylinder engaging said master cylinder piston and advanceable in the power cylinder to advance the master cylinder piston, seal means at each end of the power piston between the said piston and its cylinder, said power piston having a reduced diameter portion between the seal means thereon forming with said power cylinder an annular fluid chamber closed at its ends by shoulders of the large diameter portion of the power piston, said shoulders having different areas exposed to the fluid pressure in said annular chamber, the differential in area of the shoulders providing for movement of the power piston toward the work end of the power cylinder upon release of fluid pressure from the said work end, a fluid pressure inlet port in said body between said power piston seal means continuously communicating with said annular fluid pressure chamber, fluid passage means in said power piston connecting said fluid pressure inlet port in said body to the work end of said power piston, a valve member carried in said power piston controlling admittance of fluid pressure to the work end of the power piston and exhaust of fluid pressure from the said work end, a closure wall for the work end of said power cylinder, and a valve operating member projecting through the closure wall into engagement with said valve member to actuate the same, said master cylinder piston having a bore therein receiving a piston freely movable in the bore and having passage means connecting the bore with the master cylinder for transfer of pressure fluid from the master cylinder into the bore, and a plunger member slidable in said power piston and engaging said valve member and said piston in said master cylinder piston to transfer "feel" of brake operating pressure from the master cylinder to said valve operating member.

4. An hydraulic power actuator for operating hydraulic brakes, comprising in combination, a body having a longitudinally extending bore one end portion of which forms a master cylinder and the other portion forming a power cylinder, a master cylinder piston advanceable in said master cylinder to compress fluid therein to effect brake energization, a seal member forming the inner end wall of the master cylinder, said master cylinder piston extending through said seal member into the power cylinder, a power piston in said power cylinder engaging said master cylinder piston and advanceable in the power cylinder to advance the master cylinder piston, seal means at each end of the power piston between the said piston and its cylinder, said power piston and said power cylinder between the said seal means cooperating to form an annular fluid pressure chamber between the said seal means, a fluid pressure inlet port in said body between the said power piston seal means, fluid passage means in said power piston connecting said fluid pressure inlet port in said body to the work end of said power piston, an exhaust port adjacent the work end of the power cylinder, a valve member carried in said power piston controlling admittance of fluid pressure to the work end of the power piston and exhaust of fluid pressure from the said work end, a closure wall for the work end of said power cylinder, a valve operating member projecting through the closure wall into engagement with said valve member to actuate the same, said master cylinder piston having a bore therein receiving a piston freely movable in the bore and having passage means connecting the bore with the master cylinder for transfer of pressure fluid from the master cylinder into the bore, and a plunger member slidable in said power piston and engaging said valve member and said piston in said master cylinder piston to transfer feel of brake operating pressure from the master cylinder to said valve operating member.

5. An hydraulic power actuator for operating hydraulic brakes, comprising in combination, a body having a longitudinally extending bore one end portion of which forms a master cylinder and the other end portion forming a power cylinder, a bored master cylinder piston advanceable in said master cylinder to compress fluid therein to effect brake energization and having a reaction piston in the said bore urged retractively by the brake operating force exerted within the master cylinder, said reaction piston having a seal thereon to prevent loss of hydraulic fluid from the master cylinder, a seal member forming the inner end wall of the master cylinder, said master cylinder piston extending through the seal member into the power cylinder, a bored power piston in said power cylinder engaging said master cylinder piston and advanceable in the power cylinder to advance the master cylinder piston, seal means at each end of the power piston between the said piston and its cylinder, said power piston and said power cylinder cooperating between the said seal means thereon to provide an annular fluid pressure chamber, a fluid pressure inlet port in the said body between said power piston seal means continuously communicating with said annular fluid pressure chamber, fluid passage means in said power piston connecting said fluid pressure inlet port in said body to the work end of said power piston, closure wall means closing the end of said power cylinder and cooperating with the power piston to form a work chamber between the said closure wall and the power piston, a valve member slidably carried in said bore of said power piston and movable therein to control admittance of fluid pressure to the said work chamber of the power piston and exhaust of fluid pressure from the said work chamber, a plunger member slidable in said bore of said power piston extending between said valve member and said reaction piston to transfer retractive movement of the reaction piston to the valve member, said closure wall for said work end of said power cylinder having a bore therein receiving a plunger having one end extending through the closure wall into engagement with said valve member to effect manipulation of said valve member thereby and receive reaction force from the valve member, an exhaust port communicating with said bore in said closure wall, the plunger in said closure wall having a passage therein communicating with said exhaust port, and passage means in said valve member adapted for connection of the said work chamber of said power cylinder with the passage means in the said last mentioned plunger.

References Cited in the file of this patent

UNITED STATES PATENTS

| | | |
|---|---|---|
| 1,960,996 | Guernsey | May 29, 1934 |
| 2,136,318 | Rossmann | Nov. 8, 1938 |
| 2,642,165 | Banker | June 16, 1953 |
| 2,685,171 | Price | Aug. 3, 1954 |
| 2,766,732 | Schultz | Oct. 16, 1956 |
| 2,775,957 | Anderson | Jan. 1, 1957 |
| 2,790,306 | Ingres | Apr. 30, 1957 |

FOREIGN PATENTS

| | | |
|---|---|---|
| 673,425 | Great Britain | June 4, 1952 |